United States Patent [19]

Patzelt et al.

[11] Patent Number: 4,750,919

[45] Date of Patent: Jun. 14, 1988

[54] PAINT REMOVAL USING OIL-IN-WATER EMULSIONS

[75] Inventors: Robert R. Patzelt, Wheaton, Ill.; Edwin C. Zuerner, Troy, Mich.; Michael L. Dwyer, Joliet, Ill.

[73] Assignee: Nalco Chemical Company, Naperville, Ill.

[21] Appl. No.: 111,826

[22] Filed: Oct. 23, 1987

[51] Int. Cl.$^4$ .............................................. B01D 21/01
[52] U.S. Cl. .......................................... 55/45; 55/85; 55/89; 210/708
[58] Field of Search .................. 55/84, 85, 89, 45; 98/115.2; 210/708

[56] References Cited

U.S. PATENT DOCUMENTS 4,378,235  3/1983  Cosper et al. ........................ 55/85
4,396,405  8/1983  Lindenberger et al. ............... 55/85
4,472,181  9/1984  Herrlander ........................ 55/85 X

*Primary Examiner*—Charles Hart
*Attorney, Agent, or Firm*—John G. Premo; Anthony L. Cupoli; Joan I. Norek

[57] ABSTRACT

A method for the removal of over-sprayed paint solids which comprises contacting the over-sprayed paint solids with an oil-in-water emulsion until the emulsion is loaded with at least 5 parts by weight of paint solids per 100 parts by weight of the hydrocarbon liquid of the emulsion.

16 Claims, No Drawings

PAINT REMOVAL USING OIL-IN-WATER EMULSIONS

INTRODUCTION

Great quantities of paints, lacquers, varnishes, base coats and clear coats, hereinafter referred to as paints, are used in the automobile, appliance, and allied industries to coat finished products. In the use of these materials, generally in enclosed areas called paint spray booths, substantial quantities of the paint is oversprayed, that is, is not transferred to the object being coated. Paint spray booths generally comprise a chamber, a duct system for passing air down through such chamber, which air flow is a type of wash stream that generally captures both over-sprayed paint particles and volatile organic paint carriers present in the chamber's atmosphere into a sump containing a circulating hydrophilic liquid located at the bottom of the chamber which receives the volatile organic paint carriers and paint particles from the air stream containing them.

Paint spray booths generally represent major items of capital expense and, as such, replacing paint spray booths with other systems which would enable more efficient removal of the over-sprayed paint particles would be prohibitively expensive.

The subject invention is directed to a process for the efficient removal of over-sprayed paint solids from paint spray booth systems. The process of this invention calls for the use of an oil-in-water emulsion which will detackify the paint solids including the oil-in-water emulsion disclosed in U.S. Pat. No. 4,378,235, incorporated hereinto by reference. The method disclosed in U.S. Pat. No. 4,378,235 is directed to recovering volatile organic paint carrier from paint spray booths by optimization of the amount of carrier received by the oil-in-water emulsion employed as the hydrophilic liquid in the sump and efficient recovery of the carrier from the emulsion, in order to reduce exhaust emissions of the volatile carriers.

The emulsions disclosed in U.S. Pat. No. 4,378,235, detackify the over-sprayed paint solids, rendering them nonadhesive to metal surfaces and thus easy to remove from the emulsion by filtration and/or skimming. As described in this Patent, the over-sprayed paint particles can be removed after breaking the emulsion. The paint particles are generally held in a sludge layer or phase which may contain, in addition to the paint solids, volatile oil carrier, the organic liquid of the emulsion, and water, the oil generally being the continuous component of the sludge layer.

For some paint spray booths the paint solids-containing sludge is more of a problem or hazard than the emissions of volatile organic carriers. While incineration of paint solids recovered from such emulsions is known from U.S. Pat. No. 4,378,235, sludges having high BTU values may be used as auxiliary fuels. For a process such as disclosed in that Patent to continuously reduce emissions of volatile organic carrier, the emulsion must at all times have capacity for absorption of additional volatile carrier, because as soon as its maximum loading is reached a steady-state condition exists and the volatile organic carrier will be emitted without any abatement from the process. Hence the hydrophilic liquid in the sump must be replaced with fresh before it is exhausted. As disclosed in U.S. Pat. No. 4,378,235, the oil-in-water emulsion is broken by adjusting the pH of the emulsion to below 6.5, the volatile organic paint carrier is recovered from the oil phase, and the oil and aqueous phases are recombined, thereby providing fresh emulsion. As is also disclosed in that Patent, the paint sludge generated by this process also holds some of the volatile organic paint carrier, and given its detackified nature, making it easy to remove, there is no purpose in recombining the phases without sludge removal. This process, which requires frequent refreshing of the emulsion for emission abatement, not only requires the employment of a significant amount of fresh emulsion, may not generate sludge of sufficiently high BTU value to be used as an auxiliary fuel, and instead such sludge, if to be disposed of by incineration, may be an energy depleting factor in the overall process.

It is an object of the present invention to provide a method for the removal of over-sprayed paint particles from paint spray booths that produces a sludge with a high BTU value, provides efficient handling of the sludge, that is less sensitive to daily process load and surge loads of liquid paint, purge solvents, and clean-up solvents, reduces the volume of scrubbing liquid required for cleaning up the booth, while leaving a potential for some overall reduction in volatile organic carrier and recovery of solvents derived from the paints or strippers or cleaners used in the spray booth. These and other objects will appear hereinafter.

THE INVENTION

This invention is directed to a method for the removal of paint solids from paint spray booth systems. The paint spray booths of the type for which this invention is designed may be of a wet wall, center draft, or other construction. Paint spray booths of these types operate, in a sense, as large gas scrubbers with air passing through the booth picking up paint particles that do not meet the object being painted, together with volatile organic carriers. The air, after picking up the materials, passes into a sump or the like where it is intimately contacted with the hydrophilic fluid which is generally recirculated throughout the paint spray booth. The hydrophilic fluid receives over-sprayed paint particles to prevent their release into the atmosphere and also has served to some extent to trap the organic vapors collected from the booth.

This invention, utilizing an oil-in-water emulsion as the hydrophilic liquid, which emulsion is described in more detail below, is an improved method for the removal of the over-sprayed paint solids. The circulation of the oil-in-water emulsion is continued, without treatment to recover any material therein, until at least 5 parts by weight of the over-sprayed paint solids are received by the emulsion for every 100 parts by weight of the organic liquid in the emulsion. In preferred embodiment, such circulation is continued until at least 10 parts by weight of the over-sprayed paint solids per 100 parts by weight of the emulsion's organic liquid are received into the emulsion.

The use of the method of the present invention drastically reduces the amount of emulsion required as compared to the fresh emulsion demand in volatile organic carrier emission abatement methods. For instance, a typical volatile organic carrier equilibrium concentration of a typical organic liquid of the emulsion is 12,000 ppm or 1.2 weight percent. For effective abatement of emissions such concentration of volatile organic carrier in the emulsion cannot be exceeded, and hence the emulsion must be freshened by replacement or recycling and recovering the volatile organic carrier, for instance by distillation or stream stripping or the like. In the present method, wherein circulation is continued without such recovery of volatile organic carrier or other material from the emulsion until the emulsion is loaded with at least 5 parts of paint solids by weight for every 100 parts weight of organic liquid, in a process spraying a paint containing about 50 weight percent solids with about a 50 percent transfer efficiency, the fresh emulsion demand is reduced to about one-third that required for volatile organic carrier abatement at the level of 25 percent. In comparison to volatile organic carrier abatement at the level of 50 percent, other factors being the same, the fresh emulsion demand is reduced to one-fifth. As used herein the term fresh emulsion means an emulsion that does not contain volatile organic carrier, such as emulsion freshly prepared or emulsion from which such carriers have been removed.

In the method of the present invention for typical paint formulations the equilibrium concentration of the volatile organic carrier in the emulsion's organic liquid will be exceeded, and hence by virtue of the steady state condition that will exist an amount of such carrier will be released from the emulsion as the circulation continues, but it will not be recovered from the emulsion, such as by breaking the emulsion and subjecting the organic liquid phase to recovery steps, until the minimum paint solids load is met, if then.

In the present method of the present invention the emulsion detackifies and disperses the paint solids, which remain generally in fluid state until separated from the water and oil phases. For a given level of emulsion its load handling capacity is at least three-fold that in a 25 percent emission abatement method and hence surge loads of liquid paint or purge solvents or clean-up solvents can be handled without performance decay.

In an embodiment of the present invention the wash stream is an emulsion of the same formulation which softens and dissolves oil paint deposits on the paint booth and carries such over-sprayed paint solvents into the emulsion in the sump.

The organic carriers that are generally encountered in paint spray booths of the type described are those commonly used as carriers in industrial finishes such as paints and lacquers and may consist of aromatic materials such as benzene, xylene, toluene, low-boiling ethers, esters, alcohols, ketones such as methyl isobutyl ketone, methyl amyl ketone, and mixtures thereof. In the method of the present invention the emulsion which is employed may act as a solvent for these types of volatile organic paint carriers. It is more important, however, in the use of this invention that the over-sprayed paint solids be detackified. This means essentially that the individual particles must not stick to the sides of the booth, process equipment, or agglomerate with themselves to form materials which cannot be easily handled. Hence an emulsion that detackifies the paint solids but is not an effective solvent for the paint carrier may be employed in the method of the present invention. The over-sprayed paint solids should be detackified to the point where they can be readily separated from the emulsion being employed. This separation step may be done by filtration, flotation, coagulation, or the like.

The oil-in-water emulsion system comprises an organic liquid having a boiling point of at least 150° C., an oil-in-water emulsifier, and water.

Before further describing the process of this invention in which the oil-in-water emulsions are utilized, the following explanation is presented for each of the components of the oil-in-water emulsions of this invention.

The Organic Liquid

The organic liquid component of the oil-in-water emulsions of this invention is a non-volatile, water-immiscible, hydrocarbon material which optionally may act as a solvent for volatile organic paint carrier used in the paint being employed in paint spray booth. Organic liquids employed may be primarily aliphatic, paraffinic, aromatic or mixtures thereof. The organic liquids may either be halogenated or non-halogenated and should generally have a boiling point greater than 150° F. and, preferably 200° F., and most preferably, above 300° F. Viscosities of materials used may range from that of a 100 SEC primarily aliphatic petroleum process oil to that of a highly chlorinated paraffinic material having a viscosity in excess of 20,000 cps. Thus, the only criteria for materials of this type are those stated above.

Typical materials which can be employed include Telura ® 323, a process oil manufactured by Exxon Company, U.S.A., which is categorized as having a boiling point of from 545°–884° F., negligible solubility in water, a specific gravity of 0.903 at 60° F., a Cleveland open cup flash point of 330° F. and a viscosity at 100° F. of 105–115 SUS. This oil is believed to be a complex mixture of aliphatic and aromatic petroleum hydrocarbons. Also useful are various chlorinated paraffinic materials such as those designated Kloro 6000, Kloro 7000, CW 52, CW 170, CW 8560 from the Keil Chemical Division of the Ferro Corporation; as well as Isopar M, a branched paraffinic material available from the Humble Oil & Refinery Company; LOPS, a low odor paraffinic solvent purchased from the Exxon Company, U.S.A.; and Marcol 82, a highly aliphatic viscous white oil available from Exxon Company, U.S.A.

For safety purposes, the organic liquid employed in the oil-in-water emulsion of this invention should be substantially non-toxic and have a flash point greater than 250° F. A preferred organic liquid for use in this invention is Telura ® 323 described above.

It will be seen, however, that substantial variations in organic liquids can be accomplished without varying from the spirit and intent of this invention. As an example, 10 weight motor oil may be satisfactorily employed as the oil phase of the oil-in-water emulsion.

The Oil-In-Water Emulsifiers

The useful oil-in-water emulsifiers are those capable of forming a relatively stable oil-in-water emulsion with the organic liquid selected. Generally these materials will have an HLB value ranging from about 6 to about 40 and most preferably from about 10 to 30. The HLB system is defined in the Atlas HLB Surfactant Selector. Since the oil-in-water emulsions of this invention do not have to be broken, ease of breakability is not an important criceria. The emulsifier may be any water-soluble anionic, cationic, nonionic, or mixture of emulsifiers falling within the above criteria. Useful emulsifiers for use in this invention are saturated and unsaturated fatty acids and alkali metal salts thereof containing 12–30 and, preferably, 16–24 carbon atoms. Other oil-in-water emulsifiers such as the condensation product of cocoamine reacted with 2 moles of ethylene oxide may be used. The preferred emulsifiers of the invention form emulsions which break when made acidic which permits efficient recovery of the sludge portion. It is expected, however, that oil-in-water emulsifiers other than those specifically enumerated herein may be employed. A particularly useful emulsifier for the method of this invention is oleic acid.

Water

The water used to form the oil-in-water emulsions of this invention should preferably not contain more than 150 ppm hardness as $Ca^{+2}$ or $Mg^{+2}$. It has been found that excessive hardness in water being used creates soap scum with fatty acid emulsifiers. If hard water is encountered, however, chelating agents such as NTA and/or EDTA may be added to the water on a 1:1 molar basis to combat hardness.

Formulation of the Emulsion

The components of the emulsion used in this invention are used in the following weight percentages:

| A. Hydrocarbon Liquid | |
| --- | --- |
| Generally | 1–50 percent by weight of the emulsion |
| Preferably | 10 to 40 percent by weight of the emulsion |
| Most Preferably | 10 to 30 percent by weight of the emulsion |
| B. Emulsifier | |
| Generally | 0.1 to 20 percent by weight of the hydrocarbon liquid |
| Preferably | 1–20 percent by weight of the hydrocarbon liquid |
| Most Preferably | 1.5–10 percent by weight of the hydrocarbon liquid |
| C. Water | balance |

The emulsion is formed by simply mixing the above-mentioned ingredients together. In formulating the emulsions of the subject invention we have generally found that emulsions having an alkaline aqueous phase of from pH 7.5–12 and preferably a pH 8–11 are preferred due to their greater ability to detackify the paint materials used. The pH adjustment of the emulsion can be accomplished by merely adding a small quantity of an alkaline metal hydroxide, preferably sodium or potassium hydroxide to water prior to mixing to form the emulsion.

One the emulsion has been formed, it may be used in the spray booth as the hydrophilic liquid to capture the volatile organic paint carrier materials and over-sprayed paints present in the paint spray booth. We have found that at the load levels mentioned above the over-sprayed paint (including lacquers) particles are detackified and do not exhaust the emulsion's capacity. These detackified materials, which additionally generally contain an amount of the volatile organic paint carrier, may then separate from the oil-in-water emulsion and the emulsion recycled. Due to the fact that the separation process or processes will also carry with them some of the oil-in-water emulsion, it has been found generally that additional quantities of the hydrocarbon liquid and emulsifier may optionally be added to maintain the composition of the oil-in-water started with.

The oil-in-water emulsion may be reused indefinitely and continuously recirculated in the paint spray booth so long as additional quantities of materials are added to replace what is lost with the over-sprayed paint particles.

The detackified over-sprayed paint particles can be removed from the oil-in-water emulsion by flotation, skimming, or the like. If the detackified paint over-spray sludge floats on the surface of the emulsion, removal may be readily accomplished by skimming using known means. Saturation is, of course, also allowable, and may be employed. The method of separation employed is not critical to this invention and other means known to those skilled in the art may be employed. In some instances it may be preferable to break the emulsion prior to removing the sludge. When the process of this invention is employed on enamel and/or base coat/clear coat materials, oily sludges may be produced which may tend to sink to the bottom of the sludge removal system, and then means for removing sludge from the bottom of the sludge removal system should be provided.

The recovered detackified over-sprayed paint particles in this invention may be further treated to recover the volatile organic component, pigment, and other paint components, or may advantageously be used as a high B.T.U. fuel. Due to the fact that loading of the emulsion with over-sprayed paint solids is high, the process is economical, and hydrocarbon oil losses are kept at a minimum level. The emulsion employed need not be breakable, and does not have to be subjected to processing steps to recover the volatile organic material or the over-sprayed paint solids.

Although the level of hydrocarbon liquid in the emulsion, as stated above, can be as low as one weight percent based on total emulsion, since the capacity of the emulsion for paint solids loading is believed to be principally dependent on the ratio of paint solids to hydrocarbon liquid, there is seldom any practical reason for conducting the present process at such low level of hydrocarbon liquid in the emulsion. In some instances, however, it may be desirable to begin the present process with a given amount of water to which is charged initially sucn a low level of hydrocarbon liquid, which then is increased as the paint solids loading in the emulsion increases whereby the amount of hydrocarbon liquid being employed in the emulsion at any time follows the paint solids loading. In a batch process, such approach may be convenient when the paint spraying may be terminated short of the original target, wherein to initially charge the hydrocarbon liquid in the amount desired for the target paint spraying would be wasteful. Where the hydrocarbon liquid is charged to the water in increments during an ongoing process, it is particularly convenient to incorporate the desired emulsifier into the hydrocarbon liquid, and hence convenient to define the emulsifier level based on hydrocarbon liquid, as given above.

The process of the present invention may be conducted as a batch process, wherein the emulsion, when loaded to the extent desired, is removed from the spray booth in bulk, to be processed for instance to recover the paint solids sludge while a fresh emulsion is placed into the sump, or for instance as a continuous process wherein the emulsion or a portion thereof is recycled after removal of the sludge after at least the minimum loading of paint solids is reached.

The paint solids loading is defined herein as a minimum and it is believed that loadings of up to possibly 40 parts of paint solids, or more, per 100 parts of hydrocarbon liquid, by weight, may be achieved.

The paint solids received by the emulsion are of course that portion of the paint solids that is oversprayed, i.e., is not transferred to the object being coated. Present commercial transfer efficiencies, the percent of paint solids sprayed that is consumed in the coating of the sprayed object, varies from about 10 to 60 percent. Within this range a transfer efficiency of about 50 percent is typical for commercial spray booth. The weight percent of paint solids in commercial paints (including lacquers and the like) ranges from about 15 to 50 percent. The higher solids paints are not untypical for enamel paints while paints of the lacquer type often are used commercially at from about 17 to 25 percent solids.

For a given commercial installation, the solids level of the paint sprayed and the transfer efficiency of the process will be known to sufficient precision to determine the desired change of hydrocarbon liquid for the over-sprayed paint solids to be removed from the spray booth in detackified form.

In an embodiment of the present invention the wash stream employed is comprised of a portion of the emulsion itself to cleanse the booth of paint solids adhering to the surfaces of the booth.

The resultant sludges contain from about 10 to 60 percent solids, from about 15 to 60 percent weight percent of the emulsion's hydrocarbon liquid, the balance being paint carrier and water, with the hydrocarbon liquid being the continuous phase. Upon breaking the emulsion the sludge layer forms between the sludge-free hydrocarbon layer and the sludge-free water layer and thus is easily separated from these layers.

EXAMPLE A

The following exemplifies the use of the method of the present invention in a typical commercial spray paint booth. In a commercial paint spray booth 350 gal. of water containing 83,700 g. hydrocarbon liquid (SEC oil) and 6,300 g. oleic acid, as an oil-in-water emulsion with a pH of 8.5–9.0, is introduced into the sump and therein circulated. A 27 weight percent solids lacquer is then sprayed at a rate of 60 grams per minute and with a transfer efficiency of 50 percent, while the downward air stream is held at a flow rate of 1980 cu.ft./minute. The spraying is continued for 10.3 hours (620 min.) at which time 37,200 grams of paint has been sprayed and 5,022 grams of over-sprayed paint solids has been carried by the air stream to the sump and there received by the emulsion. The loading of over-sprayed paint solids to hydrocarbon liquid of the emulsion is 6 parts by weight paint solids per 100 parts by weight of hydrocarbon liquid. The emulsion is then removed from the sump, broken by a downward adjustment of pH, and the sludge layer, containing paint solids, hydrocarbon liquid, paint carrier and water is removed for use as an auxiliary fuel. The sludge-free hydrocarbon liquid and water layers are recombined together with an additional amount of hydrocarbon liquid and emulsifier for future use.

EXAMPLE B

The procedure of Example A is followed except that the spraying is continued for 20.7 hours (1240 min.) at which time 74,400 grams of paint has been sprayed and 10,444 grams of over-sprayed paint solids has been carried to and received by the emulsion, whereupon the emulsion loading has been increased to 12 parts by weight paint solids per 100 parts by weight of hydrocarbon liquid.

EXAMPLE C

The procedure of Example A is followed except that after ten hours of spraying 25 percent of the emulsion is removed from the sump, broken by pH adjustment, and then recombined after removal of the sludge layer and the addition of the amount of hydrocarbon liquid and emulsifier contained in the sludge layer, and the spraying is continued for additional hours.

EXAMPLE D

The procedure of Example A is followed except that prior to the commencement of spraying the walls of the booth are cleansed of adhering paint solids by a wash stream comprised of a 30 gal. aliquot of the emulsion.

EXAMPLE E

The procedure of Example A is followed except that in place of the 83,700 grams SEC oil and 6,300 grams of oleic acid, 180,000 grams of formulated composition containing the hydrocarbon liquid and emulsifier, having a composition as set forth below, is used.

Formulated Composition 70.0% Oil, Napthenic 100 sec neutral
3.7% Tall oil, fatty acid, 26% rosin
1.3% Chlorinated paraffin wax
10.7% Sodium petroleum sulfonate
4.7% Sulfonated castor oil
3.7% Fatty acid (waste stream)
3.3% Isopropanol amine (mixed)
1.4% Biocide
0.001% Anti-foam

EXAMPLE F

The procedure of Example E is followed except that only 30,000 of the 180,000 grams of formulated hydrocarbon liquid/emulsifier composition is initially charged, the remainder being added at intervals over the 10.3 hour spraying period.

The term "paint" is used herein generically for the various coating compositions employed in paint spray booths, including clear coats, lacquers, enamels, and the like.

All percentages set forth herein, unless expressly indicated otherwise, are percentages based on weight.

The above examples illustrate how the method of the present invention may be utilized to remove over-sprayed paint particles in a detackified form and provide a system whereby the disposal of the paint solids, particularly by use as an auxiliary fuel, reduces the hazards and problems attendant thereon and the amount of fresh emulsion employed for given spraying conditions and periods is reduced. These examples are not given as any type of limitation of the invention.

We claim:
1. In an improved method for the removal of over-sprayed paint particles from paint spray booths of the type comprising a chamber, means for passing a wash stream capturing over-spraying paint particles down through said chamber, a sump located at the bottom of said chamber and containing a circulating oil-in-water emulsion receiving said over-sprayed paint particles from said wash stream, said oil-in-water emulsion comprised of from 5 to 50 weight percent of an organic liquid having a boiling point of at least 150° C., from 1.0 to 20 weight percent based on the organic liquid of an oil-in-water emulsifier, and the balance water, and said oil-in-water emulsion being maintained at a pH value of from 7.5 to 12, the improvement which comprises:

continuing the circulation of said oil-in-water emulsion until at least 5 parts by weight of said over-sprayed paint solids for every 100 parts by weight of said organic liquid are received by said oil-in-water emulsion prior to recovery of any material from said emulsion.

2. The method of claim 1 wherein said wash stream is an air stream or a stream of said oil-in-water emulsion or combination thereof.

3. The method of claim 1 including the further steps of removal of said over-sprayed paint particles from said oil-in-water emulsion and then recycling said oil-in-water emulsion without separate recovery of any volatile organic paint carrier that may be contained therein.

4. The method of claim 1 wherein said oil-in-water emulsion contains from 10 to 30 weight percent of said organic liquid.

5. The method of claim 1 wherein said oil-in-water emulsion contains from 1.5 to 10 weight percent of emulsifier based on said hydrocarbon liquid.

6. The method of claim 1 wherein the circulation of said oil-in-water emulsion is continued until at least 10 parts by weight of said over-sprayed paint solids for every 100 parts by weight of said organic liquid are received by said oil-in-water emulsion prior to recovery of any material from said emulsion.

7. The method of claim 1 wherein the paint solids are recovered from the emulsion as a sludge containing some of said hydrocarbon liquid.

8. The method of claim 7 including the further step of employing said sludge as an auxiliary fuel.

9. The method of claim 1 wherein said oil-in-water emulsion after having received at least 5 parts by weight of said over-sprayed paint solids for every 100 parts by weight of said organic liquid is broken to provide a separate sludge layer containing said over-sprayed paint solids.

10. A method for the continuous removal of over-sprayed paint particles from paint spray booths of the type comprising a chamber, means for passing a wash stream capturing over-sprayed paint particles down through said chamber, a sump located at the bottom of said chamber and containing a circulating oil-in-water emulsion receiving said over-sprayed paint particles from said wash stream, said oil-in-water emulsion comprised of from 5 to 50 weight percent of an organic liquid having a boiling point of at least 150° C., from 1.0 to 20 weight percent based on said organic liquid of an oil-in-water emulsifier, and the balance water, and said oil-in-water emulsion being maintained at a pH value of from 7.5 to 12, the improvement which comprises:

(a) continuing the circulation of said oil-in-water emulsion until at least 5 parts by weight of said over-sprayed paint solids for every 100 parts by weight of said organic liquid are received by said oil-in-water emulsion;

(b) separating said over-sprayed paint solids from said oil-in-water emulsion;

(c) recovery said over-sprayed paint solids;

(d) adding additional hydrocarbon liquid and oil-in-water emulsifier to maintain the composition of said emulsion; and (e) continuing with steps (a) through (d) above.

11. The method of claim 10 wherein said oil-in-water emulsion contains from 10 to 30 weight percent of said organic liquid.

12. The method of claim 11 wherein said oil-in-water emulsion contains from 1.5 to 10 weight percent of emulsifier based on said hydrocarbon liquid.

13. The method of claim 10 wherein the circulation of said oil-in-water emulsion in step (a) is continued until at least 10 parts by weight of said over-sprayed paint solids for every 100 parts by weight of said organic liquid are received by said oil-in-water emulsion.

14. The method of claim 10 wherein the paint solids are recovered from the emulsion as a sludge containing some of said hydrocarbon liquid.

15. The method of claim 10 including the further step (f) of employing said sludge as an auxiliary fuel.

16. The method of claim 10 wherein in step (b) said organic liquid is broken to provide a separate sludge layer containing said over-sprayed paint solids.

* * * * *